Figure 1:
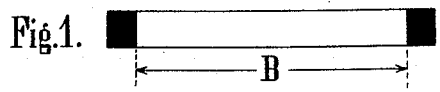

P. BECK.
BASE LINE TELEMETER.
APPLICATION FILED DEC. 30, 1910.

1,103,023.

Patented July 14, 1914.
2 SHEETS—SHEET 1.

P. BECK.
BASE LINE TELEMETER.
APPLICATION FILED DEC. 30, 1910.

1,103,023.

Patented July 14, 1914.
2 SHEETS—SHEET 2.

UNITED STATES PATENT OFFICE.

PAUL BECK, OF MUNICH, GERMANY.

BASE-LINE TELEMETER.

1,103,023.  Specification of Letters Patent.  Patented July 14, 1914.

Application filed December 30, 1910. Serial No. 600,090.

*To all whom it may concern:*

Be it known that I, PAUL BECK, a citizen of the German Empire, and resident of Munich, Germany, have invented certain new and useful Improvements in and Relating to Base-Line Telemeters, of which the following is a specification.

This invention relates to base line telemeters with two telescopes each of which is adapted to produce images of distant objects in the field of view of the observer and consists in a telemeter construction the adjustment of which can easily be controlled by means of a rod carrying index points provided at a distance from each other equal to the base line of the telemeter. If a telemeter of the said type is directed on a rod with index points at a distance equal to the base line of the instrument and if the rod is situated at a great distance from the instrument which is practically the same as the distance of objects to be observed and measured, then the images of the index points will be formed substantially in the image plane of the instrument and the two images of each of the two index points will coincide in consequence of their distance being equal to the base line of the instrument and they will be formed at a distance from each other in the field of view equal to the distance of the middle lines of the fields of view of the two telescopes as long as the instrument is properly adjusted, so that the coincidence of the images of the said index points with the middle lines of the fields of view of the telescopes forms a means for ascertaining the correctness of adjustment of the telemeter. If however the rod with the index points is situated at a distance which is to a considerable degree less than the distance of the objects to be observed then the images of the index points are formed in a plane which does not coincide with the image plane of the instrument and cannot be properly observed. In order to allow controlling of the adjustment of the telemeter without positioning the rod with the index points at a great distance, according to this invention physical controlling points, that is to say marks provided upon a carrying body, are provided in that plane in which the images of the index points of the rod or staff are formed, at a distance equal to the distance of the images of the index points of the rod which corresponds to correct adjustment of the telemeter, so that the control of adjustment can be effectd by ascertaining if the images of the index points of the rod can be brought into coincidence with the controlling points or their images.

The invention is illustrated on the accompanying drawing wherein—

Figure 2:
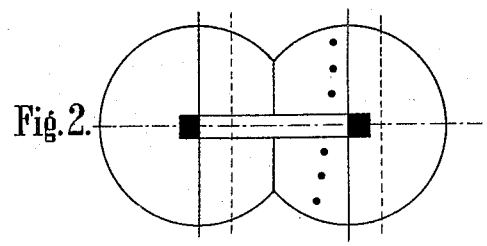
Figure 3:
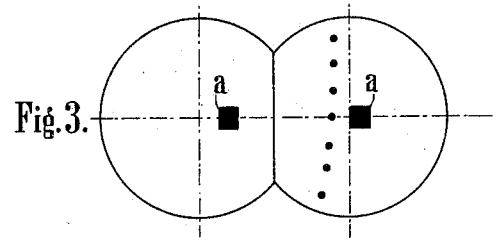
Figure 4:
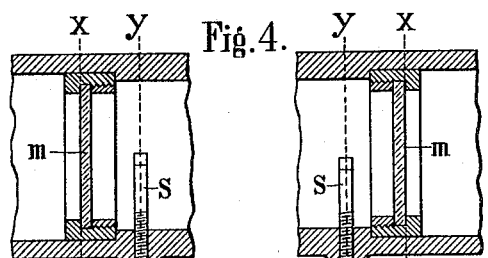
Figure 5:
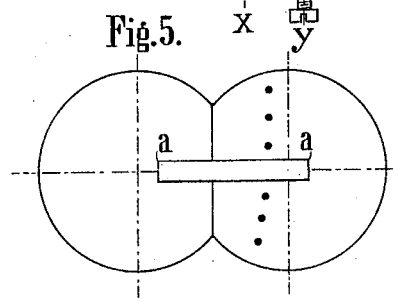
Figure 6:
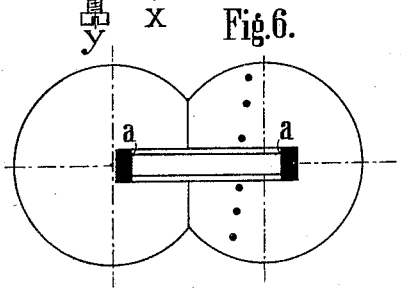
Figure 7:
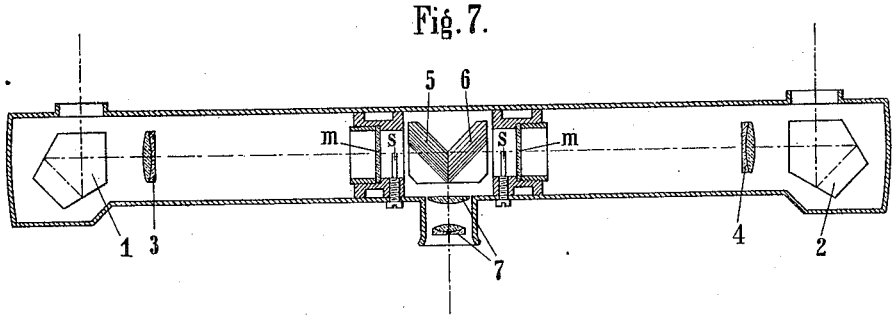

Figure 1 shows a staff having index points at a distance B from each other; Fig. 2 shows the index points of the staff within the field of view of the instrument; Fig. 3 shows controlling points arranged in accordance with the invention within the field of view of the instrument; Fig. 4 shows a longitudinal section through parts of the two telescopes of the instrument with physical controlling points in the form of pins therein; Fig. 5 shows the image of the controlling points within the field of view of the instrument; Fig. 6 shows the field of view with the images of the controlling points and of the index points of a rod; Fig. 7 shows diagrammatically a longitudinal section through a complete telemeter in accordance with the invention.

If the rod with index points having their edges at a distance equal to the base line of the instrument is positioned at a great distance and if the instrument is in proper adjustment then the index points are reproduced in the field of view of the instrument in the manner illustrated in Fig. 2, where the edges of the index points coincide with the middle section lines of the fields of view of the two telescopes or with lines which are lying at equal distances on the same side of the middle lines as indicated in Fig. 2 in dotted lines.

Instead of the middle lines or lines at equal distances from the middle lines for controlling purposes, to be used in connection with index points at great distance, controlling points, such as colored dots provided at a plane different from the image plane of the instrument and corresponding to the plane where the image of the rod positioned at a definite moderate distance is formed can be provided in order to be used in connection with index points of a rod positioned at such moderate distance; Fig. 3 shows the field of view of the instrument with such controlling points which may be provided on a glass plate.

In Fig. 4 controlling points are provided within the two telescopes belonging to the telemeter consisting of the end edges of pins *s* which pass through the casing of the instrument and are adjustable from outside. The image planes where the images of the objects, the distance of which is to be measured are formed are designated $x$, $x$ and plates $m$, $m$ are provided at such planes, each carrying a middle line and distance measuring dots the images of said middle line and said dots in the field of view can be seen in Figs. 5 and 6. Such middle line and measuring points allow distance measuring in a known manner by bringing one image of the distant object into coincidence with the middle line and by observing the position of the other image with relation to the measuring points, such position being characteristic for the distance of the object. The controlling points of the telescopes, formed by the front edges of pins $s$ are positioned in the image planes $y$ of the rod positioned at moderate distance. The end edges of pins $s$ appear as ends of a horizontal bar in the field of view as shown in Fig. 5. These edges coincide with the edges of the images of the index points on the rod at moderate distance as shown in Fig. 6; and such coincidence forms the characteristic feature for exact adjustment of the instrument in accordance with this invention. This becomes more clear by considering the image forming conditions of the whole instrument illustrated in Fig. 7 where 1, 2 designate two penta prisms at the ends of the base of the instrument, 3, 4 the objectives of the two telescopes of the telemeter, 5, 6 roof edged ocular prisms and 7 the ocular.

$m$ and $s$ are the same members as represented in the fractional section of the instrument shown in Fig. 4. It is obvious from Fig. 7 that pins $s$ appear in the field of view by reflection on the surfaces of prisms 5, 6 as horizontal bars overlapping each other so that a single bar is formed the ends of which correspond to the free edges of pins $s$. It is furthermore clear that if a rod with index points at a distance equal to the base-line of the telemeter is positioned at a definite moderate distance the index points of the rod appear in the index field and coincide with the ends of said image rod as illustrated in Fig. 6 as long as the penta prisms 1, 2 and objectives 3, 4 are properly adjusted.

What I claim is:

1. A base-line telemeter comprising two telescopes provided with controlling points arranged in planes corresponding to the image planes of objects situated nearer to the telemeter than those objects the distance of which is to be measured by the telemeter.

2. A base-line telemeter comprising two telescopes provided with controlling points arranged in planes different from the image planes of the telescopes where the images of the objects the distance of which is to be measured are formed the controlling point carrying members being adjustable from outside the instrument.

3. A base-line telemeter comprising two telescopes each provided with a pin adjustably inserted in its casing and located at a plane different from the image plane where the images of the objects the distance of which is to be measured are formed.

In testimony whereof I have signed this specification in the presence of two subscribing witnesses.

PAUL BECK.

Witnesses:
A. V. W. COTTER,
MATHILDE K. HELD.